United States Patent
Park et al.

[11] Patent Number: 5,669,384
[45] Date of Patent: Sep. 23, 1997

[54] REAL TIME DIGITAL RECEPTION FOCUSING METHOD AND APPARATUS ADOPTING THE SAME

[75] Inventors: Song Bai Park; Moo Ho Bae; Ki Jeon, all of Seoul, Rep. of Korea

[73] Assignee: Medison Co., Ltd., Kangwon-Do, Rep. of Korea

[21] Appl. No.: 718,353

[22] PCT Filed: Feb. 6, 1996

[86] PCT No.: PCT/KR96/00016

§ 371 Date: Oct. 3, 1996

§ 102(e) Date: Oct. 3, 1996

[87] PCT Pub. No.: WO96/24288

PCT Pub. Date: Aug. 15, 1996

[30] Foreign Application Priority Data

Feb. 6, 1995 [KR] Rep. of Korea .................. 95-2084

[51] Int. Cl.$^6$ ...................................................... A61B 8/00
[52] U.S. Cl. ...................................................... 128/661.01
[58] Field of Search ........................ 128/660.07, 661.01; 73/625, 626; 250/201.9, 332, 334, 353

[56] References Cited

U.S. PATENT DOCUMENTS

| | | |
|---|---|---|
| 4,706,499 | 11/1987 | Anderson . |
| 5,093,563 | 3/1992 | Small et al. ........................ 250/201.9 |
| 5,301,674 | 4/1994 | Erikson et al. . |
| 5,477,859 | 12/1995 | Engeler ........................ 128/661.01 |

FOREIGN PATENT DOCUMENTS

| | | |
|---|---|---|
| 0314487A2 | 5/1989 | European Pat. Off. . |
| 4323313A1 | 1/1994 | Germany . |

OTHER PUBLICATIONS

PCT International Search Report, International Application No. PCT/KR96/00016, Date of Completion of Search—May 24, 1996, Sheets 1, 2 and Annex.

*Primary Examiner*—George Manuel
*Attorney, Agent, or Firm*—Morgan & Finnegan

[57] ABSTRACT

A real time digital reception focusing apparatus calculates a focusing delay time using information on the center of array transducing element, a corresponding transducing element and a scan line. The focusing delay time with respect to each transducing element is calculated by each transducing element. To calculate the focusing delay time on a real time basis, first coefficient signals output from a plurality of coefficient generators which are disposed in parallel are input to a first multiplexer. The first multiplexer selects one among the first coefficient signals according to a select control signal corresponding to a present decision variable signal. The decision variable signal with respect to the present focal point output from the decision variable generator is used for generation of a decision variable signal in the next focal point. A sampling clock generator calculates an integer focusing delay time for the next focal point and generates a sampling clock in a sampling interval using the integer focusing delay time obtained by the above calculation. Thus, it is possible to design the digital reception focusing apparatus using a simple hardware to enable a real time focusing operation. The digital focusing apparatus can be applied to a beam focusing system as well as an ultrasound reception focusing apparatus using an array transducer.

19 Claims, 6 Drawing Sheets

REAL TIME DIGITAL RECEPTION FOCUSING METHOD AND APPARATUS ADOPTING THE SAME

TECHNICAL FIELD

The present invention relates to a method for focusing a reception signal which is reflected from an object and an apparatus adopting the same, and more particularly to a real time processing method of digital reception focusing in an ultrasound imaging system or beam focusing system which uses an array transducer, and an apparatus adopting the same.

BACKGROUND ART

In the field of a modern medical science, ultrasound diagnosis has been well advanced and became a general, essential diagnostic technology. Such ultrasound diagnostic equipment becomes digitized and integrated due to an engineering technological development on its design and implementation, thereby accomplishing compactness, light and high efficiency. To improve lateral resolution which is a crucial factor among performances of the ultrasound diagnostic equipment, a method of focusing transmission and reception waves by using an array transducer is widely used. Particularly, a reception focusing portion which is used in focusing a reception wave is very complex, so that a number of researches on performance improvement has been progressed. Such researches are shown in the following references entitled: [1] "Ultrasound Phased Array Delay Lines Based on Quadrature Sampling Techniques" by J. E. Powers, D. J. Phillips, M. A. Brandestini and R. A. Sigelmann disclosed in *IEEE Trans. Son. Ultrason.*, vol. SU-27, no. 6, pp. 287–294, 1980; [2] "Delay Quantization Error in Phased Array Images" by P. A. Maginin, O. T. Von Ramm and F. L. Thurstone disclosed in *IEEE Trans. Son. Ultrason.*, vol. SU-28, no. 5, pp. 305–310, 1981; [3] "Beam Steering with Linear Arrays" by O. T. Von Ramm and S. W. Smith disclosed in *IEEE Trans. Son. Biomed. Eng.*, vol. BME-30, no. 8, pp. 438–452, 1983; and [4] "Synchronous Dynamic Focusing for Ultrasound Imaging" by G. Manes, P. Tortoli, F. Andreuccetti, G. Avitabile and C. Atzeni disclosed in *IEEE Trans. UFFC*, vol. 35, no. 1, pp. 14–21, 1988. The reception focusing portion should be made of an integrated circuit (IC) to achieve compactness and high efficiency. A number of researches for digitizing the reception focusing portion are shown in the following references entitled: [5] "Pipelined Sampled-Delay Focusing in Ultrasound Imaging Systems" by J. H. Kim, T. K. Song and S. B. Park disclosed in *IEEE Trans. Ultrason. Imag.*, vol. 9, pp. 75–91, 1987; and [6] "A New Digital Phased Array System for Dynamic Focusing and Steering with Reduced Sampling Rate" by T. K. Song and S. B. Park disclosed in *IEEE Trans. Ultrason. Imag.*, vol. 12, pp. 1–16, 1990.

As presented in the above reference [6], the essential elements of a digital reception focusing portion are a digital delay device, a digital full-adder, a sampling clock generator, etc. Among them, the sampling clock generator is generally comprised of a large-capacity, high-speed look-up table (LUT) memory in the form of a read-only-memory (ROM). Thus, it has been very difficult in implementing all three portions such as a digital delay device, a digital full-adder, and a sampling clock generator into an application specific integrated circuit (ASIC).

DISCLOSURE OF INVENTION

Therefore, to solve the above problems, it is an object of the present invention to provide a new method and apparatus for calculating focusing delay on a real time basis with a sufficient accuracy via a simple hardware implementation without using a look-up table memory as a sampling clock generator.

To accomplish the above object of the present invention, there is provided a real time digital reception focusing method for sampling a signal having image information on an object received via an array transducer having a plurality of transducing elements and for performing a digital reception focusing of the sample image information, the real time digital reception focusing method comprising the steps of:

establishing an integer focusing reference distance and an integer focusing delay distance with respect to each of the transducing elements so that a rate of change of the focusing delay distance with respect to the focusing reference distance when a focal point is altered is within a predetermined boundary;

updating the integer focusing reference distance and the integer focusing delay distance with respect to a second focal point according to a magnitude of a decision variable with respect to a first focusing point and coefficients for calculating the decision variable; and generating a sampling clock for focusing a signal having the image information input to each of the transducing elements into the second focal point, by a sampling interval corresponding to the updated integer focusing delay distance.

The above object can be also accomplished by providing a real time digital reception focusing apparatus for sampling a signal having image information on an object received via an array transducer having a plurality of transducing elements and for performing a digital reception focusing of the sample image information, the real time digital reception focusing apparatus comprising:

means for generating a first coefficient signal in the form of an integer which is used for generating a decision variable signal;

means for receiving the first coefficient signal generated from the coefficient signal generation means and generating the decision variable signal; and means for receiving the decision variable signal, calculating an integer focusing delay distance according to a magnitude of the decision variable signal, and generating a sampling clock by a sampling interval corresponding to the integer focusing delay distance.

Preferably, the apparatus according to the present invention can be embodied by comprising registers, adders, comparators and multiplexers.

BEST MODE FOR CARRYING OUT THE INVENTION

Hereinbelow, methods and apparatuses for real time focusing ultrasound images according to the preferred embodiments of the present invention will be described in detail with reference to the accompanying drawings.

A real time digital reception focusing method according to the present invention has been developed on the basis of a midpoint algorithm which is disclosed in a reference [7] entitled "An Efficient Ellips-Drawing Algorithm" by J. R. Van Aken disclosed in IEEE J. of Computer Graphics and Application, vol. 4, no. 9, pp. 24–35, 1984.

Figure 1:
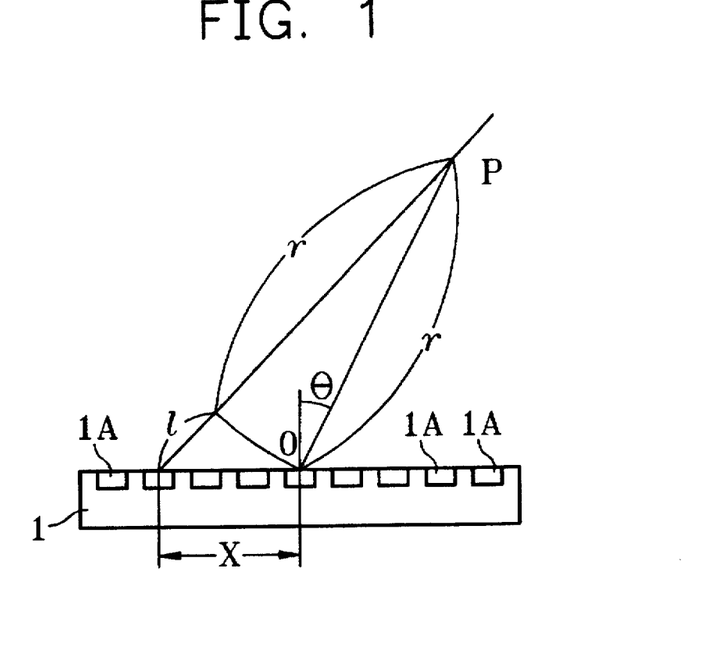
FIG. 1 is a geometrically conceptual diagram for determining focusing delay of a phased array.

FIG. 1 is a geometrically conceptual diagram for determining focusing delay of a phased array. An array transducer 1 has a one-dimensional linear arrangement. Each array elements 1A are arranged by a predetermined interval along a horizontal axis. The center of array transducer 1 is located at the origin "O." A symbol x is a horizontal coordinate at the center of an array element, θ is a steering angle which is generally zero in case of a linear array, r is a focusing reference distance which is a distance between a midpoint of an array element and a focal point P, and l is a real focusing delay distance. When an ultrasound passes through a homogeneous undamped medium, a focusing delay time of an array element is represented as the time taken when the ultrasound travels along a distance l expressed as the following equation (1), as an example of FIG. 1.

$$l = (r^2 + \alpha r + \beta)^{1/2} - r \qquad (1)$$

In the above equation, $\alpha = 2x \sin\theta$ and $\beta = x^2$. In the equation (1), r is varied according to a scan line (line OP of FIG. 1), θ is invariable with respect to the scan line, and x is constant with respect to a given array element. Thus, if a real number l can be obtained so that the equation (1) is satisfied with real number l depending on a given r, a focusing delay time is calculated to generate a sampling clock. However, in reality, calculation of a focusing delay time using equation (1) is not processed on a real time basis because of a time consumed for operations of a multiplication and a square root.

Therefore, the present invention proposes an algorithm which adopts an application of a midpoint algorithm of reference [7] and uses an addition operation of integers, to calculate a focusing delay time. First, r is moved from the right term to the left term and both terms are squared, the result from which is a function f(r, l) expressed as equation (2).

$$f(r, l) = l^2 + 2lr - \alpha r - \beta = 0 \qquad (2)$$

The present invention proposes an algorithm for rapidly calculating an approximate value of l according to r by using an algorithm which is used for a computer graphic based on the fact that equation (2) derived from equation (1) is a two-order equation with respect to r and l. Hereinbelow, several algorithms are proposed to locate an integer i which is closest to real number l which satisfies equation (2) when a focal point r increases discretely at a predetermined interval based on a midpoint algorithm. However, real number l cannot satisfies equation (1). Thus, r and l are set to satisfy equation (1) as an initial condition of the proposed algorithm. The function f(r, l) should satisfy the following conditions 1) and 2).

Condition 1): All coefficients and r's in equation (1) are integer.

Condition 2): r and l satisfies the following equation (3).

$$-1 \leq \frac{dl}{dr} \leq 0 \qquad (3)$$

The above condition 1) is satisfied so that the center frequency of a sampling clock is adjusted to make the center of each array element have a coordinate value of an integer, if steering angle θ is 0. However, When condition 1) is not met by adjustment of the center frequency in the sampling clock, the coefficient values are slightly truncated. As can be seen from a later description, an error between the coefficient values generated in this case is so small that an influence on the decision of the coefficient can be ignored. The condition 2) is met when the geometrical relationships of the steering angle θ, focal point P and array element 1A are appropriate, as shown in FIG. 1.

Figure 2:
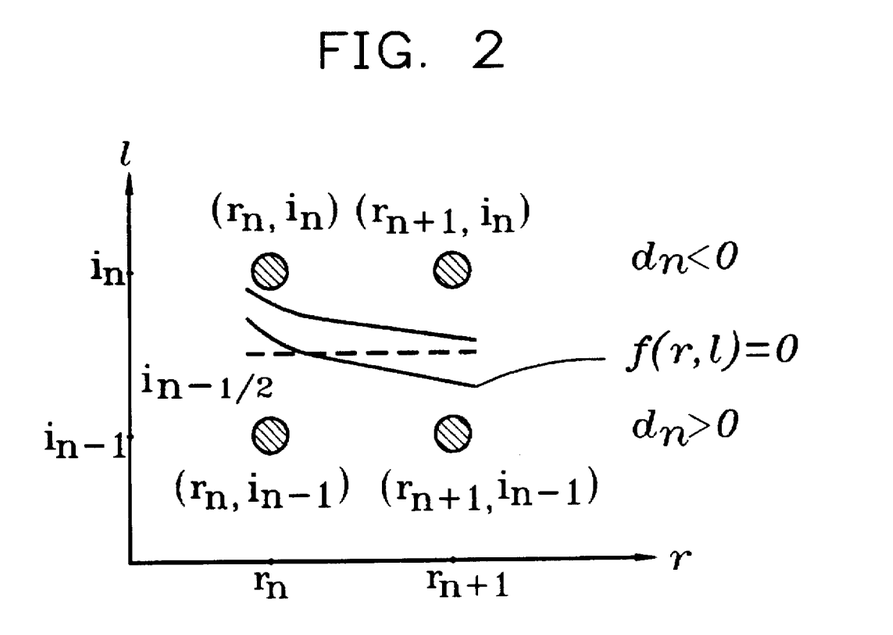
FIG. 2 is a conceptual graph for explaining a proposed algorithm according to an aspect of the present invention.

FIG. 2 is a conceptual graph for explaining a proposed algorithm according to an aspect of the present invention. Four circles shown in FIG. 2 represent a relationship between focusing reference distance r and integer focusing delay distance i, respectively. The circle selected by an algorithm which will be described later has focusing reference distance r and integer focusing delay distance i with respect to the focal point. The integer focusing delay distance i is used for generation of a sampling clock with respect to a particular focal point. An algorithm proposed to calculate a focusing delay time with respect to each focal point in an ultrasound image system will be described as follows.

First, it is assumed that an integer which is closest to real focusing delay distance $l_n$ obtained from equation (1) by n-th focusing reference distance $r_n$ is an integer focusing delay distance $i_n$. If $r_n$ and $i_n$ are given as initial conditions satisfying that $r_{n+1} = r_n + 1$, it is possible to obtain an equation $i_{n+1} = i_n$ or $i_{n+1} = i_n - 1$ by condition 2). Thus, integer focusing delay distance $i_{n+1}$ with respect to (n+1)-th focal point is determined as one of $i_n$ or $i_n - 1$ according to a first decision variable $d_n$ defined by following equation (4).

$$d_n = 4 \cdot f(r_n + 1, i_n - 0.5) \qquad (4)$$
$$= 4i_n^2 + 4i_n + 8i_n r_n - 4r_n(1 + \alpha) - 4\alpha - 4\beta - 3$$

The first decision variable $d_n$ of equation (4) is obtained by multiplying equation (2) by four to represent a resulting value of equation (2) at the midpoint of possible two points $(r_{n+1}, i_n)$ and $(r_{n+1}, i_n - 1)$ with respect to $r_{n+1}$. As shown in FIG. 2, when first decision variable $d_n$ is greater than zero, since $i_{n+1}$ is closer to $i_{n-1}$ than $i_n$, integer focusing delay distance $i_{n+1}$ is updated into $i_{n-1}$. In the reverse case, $i_{n+1}$ is updated into $i_n$. If $d_n = 0$, since each distance between $i_{n+1}$ and $i_n$ or $i_{n-1}$ is identical to each other, $i_{n+1}$ can be any one of two. In such a manner, integer focusing delay distance $i_n$ can be calculated from focusing reference distance $r_n$ which progressively increases. However, although calculation of integer focusing delay distance $i_n$ using equation (4) is slightly more efficient than that using equation (1), such a calculation still includes the multiplication operations, requiring much calculation time and amount. Thus, to avoid a direct calculation of integer focusing delay distance $i_n$ via equation (4), first decision variable $d_n$ is modified by the following equations (5a) and (5b) when an initial value $d_0$ is given.

when $d_n \leq 0$, $d_{n+1} = 4 \cdot f(r_n + 2, i_n - 0.5)$      (5a)

$\quad\quad\quad\quad\quad\quad = d_n + 8i_n - 4(1 + \alpha)$ when $d_n > 0$, $d_{n+1} = 4 \cdot f(r_n + 2, i_n - 1.5)$      (5b)

$\quad\quad\quad\quad\quad\quad = d_n + 8r_n - 4(3 + \alpha)$

Therefore, when initial values $r_0$, $i_0$ and $d_0$ are given, integer focusing delay distance $i_n$ corresponding to $r_n$ in which n is positive integers, is calculated using the above equations (5a) and (5b). A basic pattern of the algorithm proposed in the present invention as described above is expressed as follows.

Algorithm 1: A basic pattern of the proposed algorithm

```
/* Define C1, C2 */
C1 = -4(1 + α);
C2 = -4(3 + α);
/* Initialize r, i, d */
r = r₀;
i = i₀;
d = d₀;
/* Algorithm body */
for(n = 0; n < N; n++){
  output(r, i);
  if (d ≤ 0){
    d = d + 8 × i + C1;
  }
  else {d = d - 8 × r + C2;
    i = i - 1;
  }
  r = r + 1;
}
```

Figure 3:
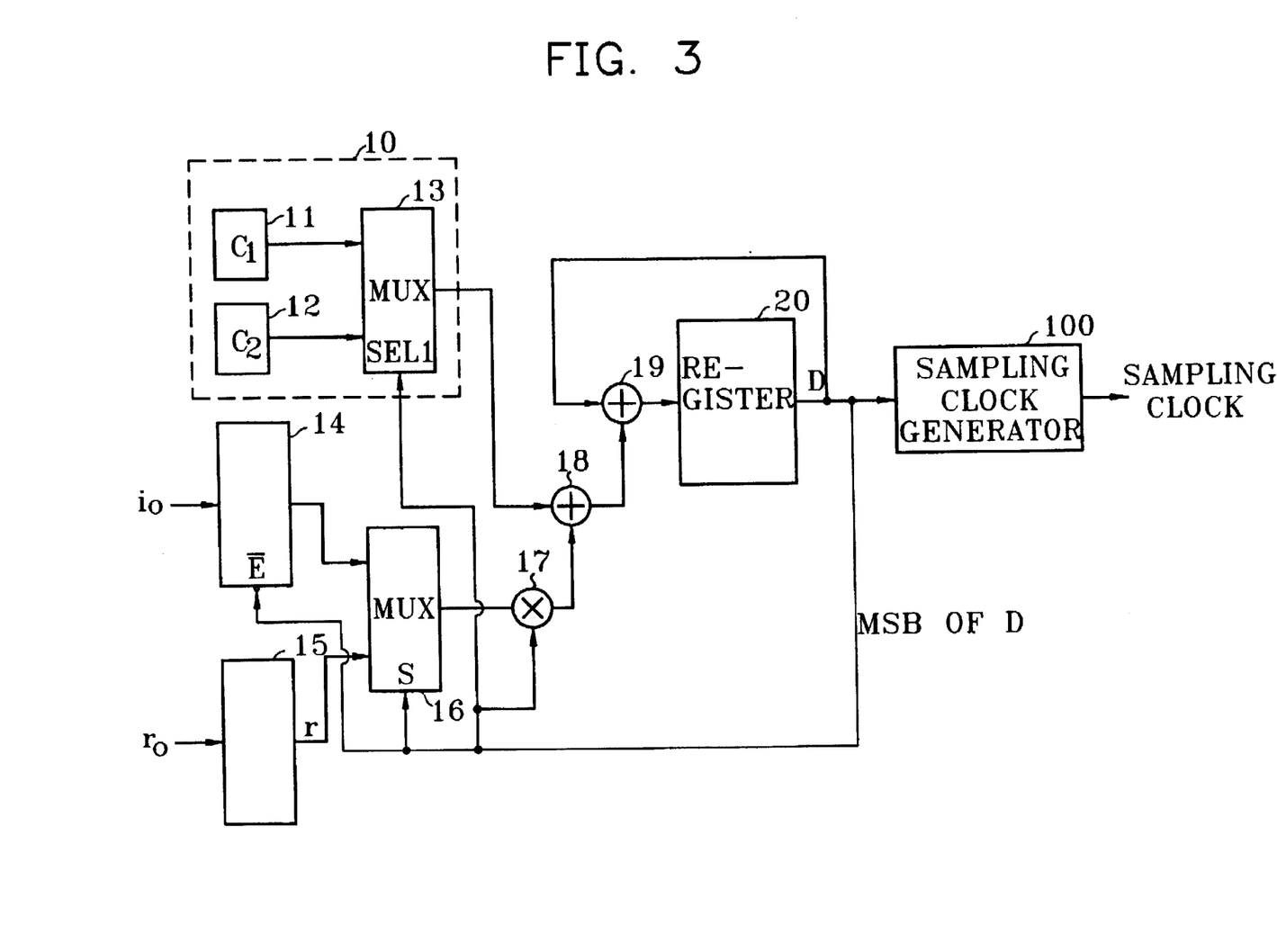
FIG. 3 is block diagram showing an apparatus embodying the algorithm 1 according to an embodiment of the present invention.

FIG. 3 is block diagram showing an apparatus embodying the algorithm 1 according to an embodiment of the present invention. In FIG. 3, a coefficient generator 10 includes a register 11 for storing a coefficient C1 shown in algorithm 1, a register 12 for storing a coefficient C2 shown in algorithm 1, and a multiplexer 13 for selectively outputting signals output from registers 11 and 12. Both signal outputs of a down-counter 14 for down-counting an initial value $i_0$ of the integer focusing delay distance and an up-counter 15 for up-counting an initial value $r_0$ of the focusing reference distance whenever a sampling clock is generated, are connected to signal inputs of a multiplexer 16, respectively. A multiplier 17 multiplies the output signal of multiplexer 16 by 8 or −8 according to the signal output from a register 20 and outputs the multiplication result. An adder 18 adds the output signals of multiplier 17 and multiplexer 13. An adder 19 adds the output signals of adder 18 and register 20, and applies the addition result to the input of register 20. Register 20 whose output is connected to a sampling clock generator 100 stores initial value $d_0$ of the first decision variable. Sampling clock generator 100 stores initial values ($r_0$, $i_0$) with respect to an initial focal point. Then, sampling clock generator 100 updates initial value ($r_0$, $i_0$) according to first decision variable data $d_n$ and generates a sampling clock according to the updated integer focusing delay distance.

If the FIG. 3 apparatus starts to operate, sampling clock generator 100 generates a sampling clock by using stored initial values $r_0$ and $i_0$. That is, sampling clock generator 100 generates the sampling clock which is delayed by integer focusing delay distance $i_0$ with respect to the focal point focusing reference distance $r_0$. Register 20 outputs the stored initial value $d_0$ to sampling clock generator 100. The most significant bit (MSB) which is a sign bit of data $d_0$ output from register 20 represents information as to whether initial value $d_0$ is larger than 0. When a value of the MSB being a sign bit of data $d_0$ output from register 20 is in a low level, multiplexer 13 of coefficient generator 10 outputs coefficient value C2 supplied from register 12. Here, down-counter 14 receives initial value $i_0$ according to the MSB applied to an enable end $\overline{E}$, and stores $i_0-1$ which is obtained by down-counting the initial value. Up-counter 15 receives initial value $r_0$, and stores $r_0+1$ which is obtained by up-counting the initial value. Multiplexer 16 outputs data $i_0$ output from down-counter 14 to multiplier 17 according to the MSB. Multiplier 17 multiplies the data output from multiplexer 16 by 8 or −8 according to the MSB applied from register 20 and outputs the multiplied result. That is, multiplier 17 multiplies the input data by 8 if the MSB data is in a high level, while the former multiplies the input data by −8 if the MSB data is in a low level. Adder 18 adds the output data from coefficient generator 10 and multiplier 17. Thus, the output data from adder 18 becomes a value of −8×r+C2. Adder 19 adds data $d_0$ stored in register 20 and the output data from adder 18. As a result, register 20 stores a value of d−8×r+C2. Sampling clock generator 100 receives the data stored in register 20 and compares the received data with 0 to determine whether the former is larger than the latter. Sampling clock generator 100 updates the stored integer focusing delay distance from $i_0$ to $i_0-1$ if the data stored in register 20 is larger than 0, and generates a sampling clock delayed by a time corresponding to integer focusing delay distance $i_0-1$. If the data stored in register 20 is not more than 0, stored integer focusing delay distance $i_0$ is maintained as it is, and generates a sampling clock delayed by a time corresponding to integer focusing delay distance $i_0$. Such an integer focusing delay distance is calculated with respect to each n of focusing reference distance $r_n$.

Meanwhile, a unit distance is defined as a distance between adjacent two focal points, a system embodying algorithm 1 should update d once each time r increases by the unit distance. By the way, assuming that a period of time of the center frequency for the sampling clock is T, a time corresponding to an increase of r by the unit distance becomes 2T since an ultrasound reciprocates from an array element to a focal point. Thus, as an example when T=20 ns, since d should be updated every 40 ns, a system designed for low-speed calculation is burdened in hardware. Therefore, rather than calculating i with respect to all r's when r=n in which n is an integer not less than 0, a calculation amount becomes reduced into 1/K when i can be calculated only when r=Kn in which K and n are natural numbers. However, condition 2) expressed as equation (3) should be modified into the following equation (6).

$$-\frac{1}{K} \leq \frac{dl}{dr} \leq 0 \quad\quad\quad (6)$$

If an aperture of an array transducer in an actual system can vary according to a value of r, equation (6) can be met with respect to a much larger value of K. In this case, the proposed algorithm is simply represented by substituting r with Kr. In the proposed algorithm, equations (2), (4), (5a) and (5b) are changed into the following equations (7), (8), (9a) and (9b).

$$f(r, l) = l^2 + 2lKr - \alpha Kr - \beta = 0 \quad\quad\quad (7)$$

$$d_n = 4l_n^2 + 4l_n(2K-1) + 8Kr_n l_n - 4K(1+\alpha)r_n - 4K(1+\alpha) - 4\beta + 1 + 8 \quad\quad\quad (8)$$

when $d_n \leq 0$, $d_{n+1} = d_n + 8Ki_n - 4K(1+\alpha)$      (9a)

when $d_n > 0$, $d_{n+1} = d_n - 8(1-K)i_n - 8Kr_n - 4K\alpha - 20K + 8$      (9b)

Thus, the above-described algorithm 1 is generalized as the following algorithm 2.

Algorithm 2: The pattern reducing the calculation amount

```
/* Define C1, C2 */
   C1 = -4 * K * (1 + α);
   C2 = -4 * K * (5 + α) + 8;
/* Initialize r, i, d */
   r = r₀;
   i = i₀;
   d = d₀;
/* Algorithm body */
for(n = 0; n < N; n++){
   output(r, i);
   if (d ≤ 0){
      d = d + 8 × K × i + C1;
   }
   else{d = d - 8 × (1 - K) × i - 8 * K * r + C2;
      i = i - 1;
   }
   r = r + 1;
}
```

Figure 4:
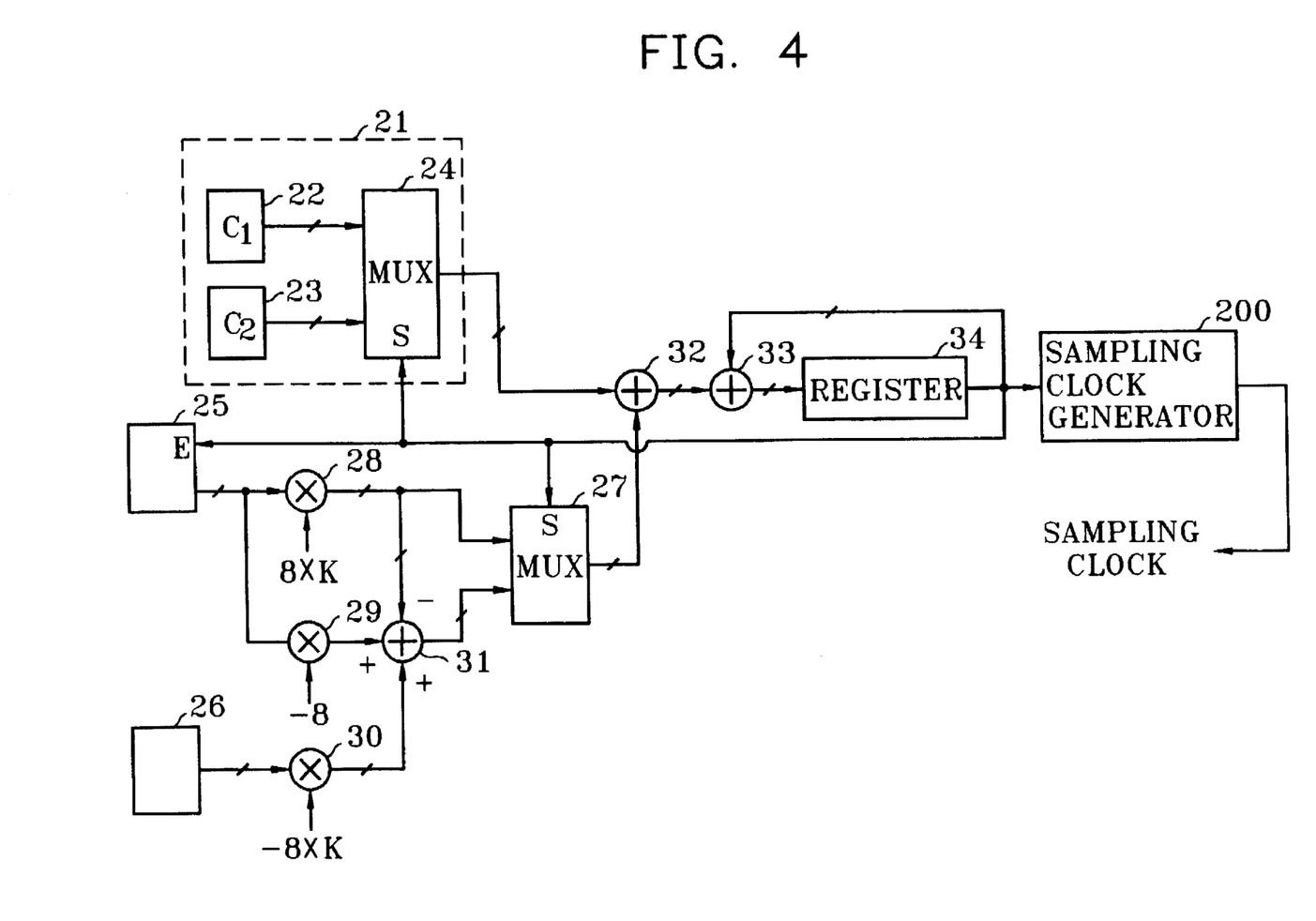
FIG. 4 is block diagram showing an apparatus embodying the algorithm 2 according to another embodiment of the present invention.

FIG. 4 is block diagram showing an apparatus embodying the algorithm 2 according to another embodiment of the present invention.

In FIG. 4, a coefficient generator 21 includes a register 22 for storing a coefficient C1 shown in algorithm 2, a register 23 for storing a coefficient C2 shown in algorithm 2, and a multiplexer 24 for selectively outputting signals output from registers 22 and 23. Multiplexer 24 outputs coefficients C1 and C2 according to the MSB of the data output from register 34. A down-counter 25 is enabled by the MSB of the data output from register 34 and down-counts an initial value $i_0$ of the integer focusing delay distance. An up-counter 26 up-counts an initial value $r_0$ of the focusing reference distance whenever the data is output to a sampling clock generator 200 from register 34. A multiplier 28 multiplies the output signal of down-counter 25 by 8K and outputs the multiplication result 8×K×i. Here, calculation determination factor K is determined by a system designer. An adder 31 adds the output signals 8×K×i, -8×i and -8×K×r of multipliers 28, 29 and 30. Multiplexer 27 selectively outputs the output data 8×K×i of adder 28 and the output data 8×K×i-8×i-8×K×r of adder 31 according to the output data of register 34. An adder 32 adds the output signals of multiplexers 24 and 27, and applies the addition result to an adder 33. Adder 33 adds the first decision variable data stored at the prior step in register 34 and the data applied from adder 32.

A signal processing procedure of the FIG. 4 apparatus will be described below. When the first decision variable data output from register 34 is less than 0, sampling clock generator 200 calculates a focusing delay time by using a stored integer focusing delay distance and generates a sampling clock delayed according to a focusing delay time. Meanwhile, multiplexer 24 outputs coefficient C1 to adder 32 by the MSB which is a select control signal from register 34. Multiplexer 27 outputs data 8×K×i generated in multiplier 28 to adder 32 according to the MSB information output from register 34. Adder 32 adds coefficient C1 and data 8×K×i and outputs the added result to adder 33. Adder 33 adds the first decision variable data of the prior step stored in register 34 and the data output from adder 32 to generate new first decision variable data. Register 34 stores the first decision variable data supplied from adder 33. The first decision variable data stored in register 34 is used for determination of the first decision variable data of the next step and generation of the sampling clock in sampling clock generator 200. Since the FIG. 4 apparatus embodying the algorithm 2 has more than two terms to be added in an addition operation, the former is disadvantageous in high-speed calculation. In this case, the above equations (9a) and (9b) can be altered for parallel operations as follows.

when $d_n ≤ 0$, $d_{n+1}=d_n+A_n$ (10a)

when $d_n > 0$, $d_{n+1}=d_n+B_n$ (10b)

Here, $A_n$ and $B_n$ are expressed as follows.

$A_n = 8Ki_n - 4K(1+α)$ (11a)

$B_n = -8(1-K)i_n - 8Kr_n - 4Kα - 20K + 8$ (11b)

By this modification, $A_{n+1}$ and $B_{n+1}$ are calculated via the following equations (12a), (12b), (12c) and (12d) instead of using equations (11a) and (11b).

When $d_n ≤ 0$, $A_{n+1} = A_n$ (12a)

$B_{n+1} = B_n - 8K$ (12b)

When $d_n > 0$, $A_{n+1} = A_n - 8K$ (12c)

$B_{n+1} = B_n - 16K + 8$ (12d)

Thus, if initial values $A_0$ and $B_0$ are further given, $A_n$, $B_n$, $d_n$, $r_n$, and $i_n$ can be obtained in sequence where n=0, 1, 2, .... A pattern for parallel operation of algorithm 2 is represented in the following algorithm 3.

Algorithm 3: The pattern paralleling algorithm 2

```
/* Define C1, C2 */
   C1 = -8 * K;
   C2 = -16 * K + 8;
/* Initialize r, i, d, A, B */
   r = r₀;
   i = i₀;
   d = d₀;
   A = A₀;
   B = B₀;
/* Algorithm body */
for(n = 0; n < N; n++){
   output(r, i);
   if (d ≤ 0){
      d = d + A;
      B = B + C1;
   }
   else{d = d + B;
      i = i - 1;
      A = A + C1;
      B = B + C2;
   }
   r = r + 1;
}
```

Figure 5:
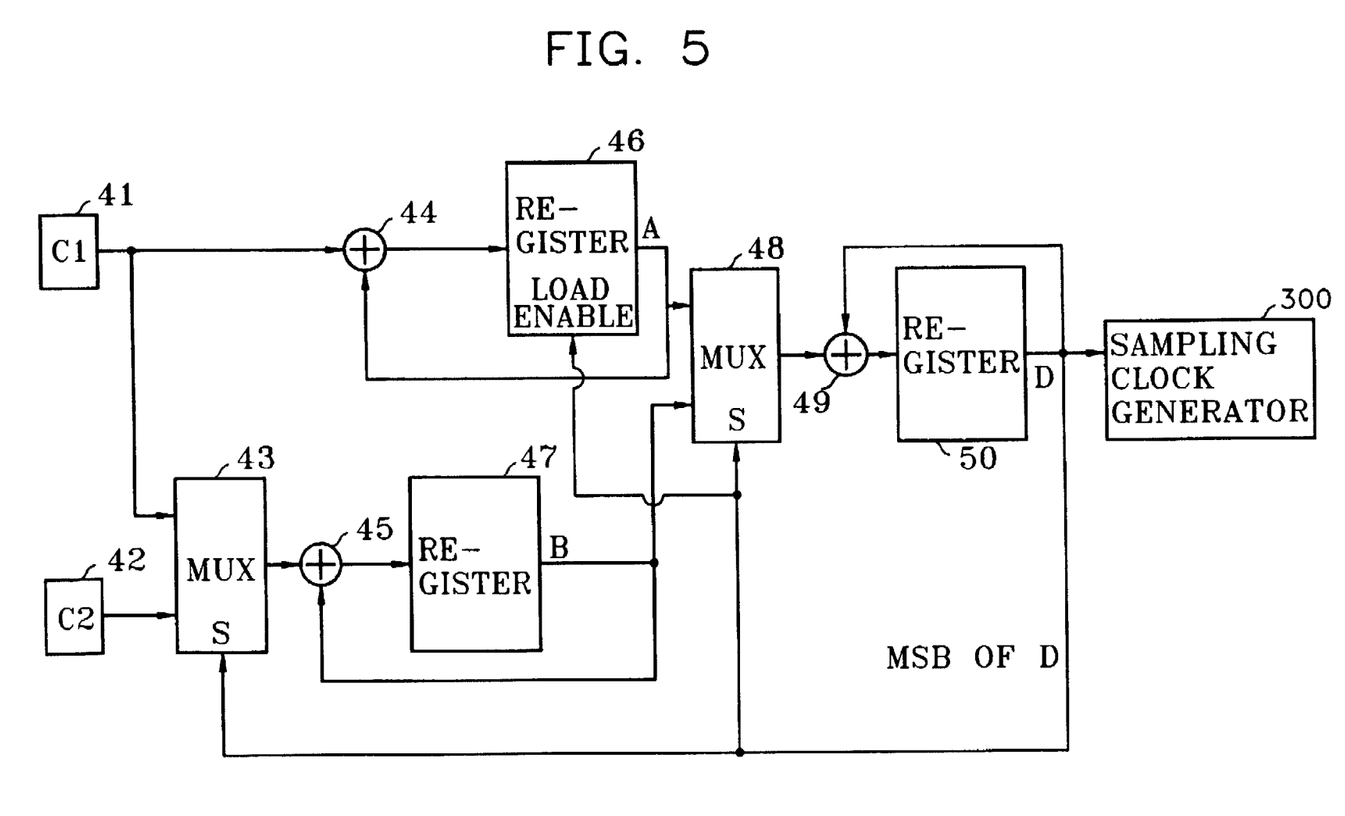
FIG. 5 is block diagram showing an apparatus embodying the algorithm 3 according to still another embodiment of the present invention.

FIG. 5 is block diagram showing an apparatus embodying the algorithm 3 according to still another embodiment of the present invention.

In FIG. 5, a register 41 for storing a coefficient C1 shown in algorithm 3, and a register 42 for storing a coefficient C2 shown in algorithm 3 supply the outputs to a multiplexer 43, respectively.

Multiplexer 43 selectively outputs one of the signals output from registers 41 and 42, according to a select control signal, that is, the MSB of the data output from register 50. An adder 44 adds data C1 applied from register 41 and data A applied from register 46 and outputs the added result to register 46. Register 46 operates according to the select control signal output from register 50. An adder 45 adds data B applied from register 47 and data C1 or C2 applied from multiplexer 43 and outputs the added result to register 47. A multiplexer 48 receives data A output from register 46 and data B output from register 47, and selectively outputs either data A or B according to the select control signal output from register 50. An adder 49 adds data D output from register 50 and the data output from multiplexer 48 and outputs the added result to register 50. A sampling clock generator 300 updates integer focusing delay distance i using first decision variable data D applied from register 50. Sampling clock generator 300 calculates a focusing delay time using an integer focusing delay distance and generates a sampling clock delayed according to the focusing delay time.

A signal processing procedure of the FIG. 5 apparatus will be described below. When the first decision variable data D output from register 50 is larger than 0, multiplexer 43 outputs coefficient C2 to adder 45 according to a select control signal generated from register 50. Multiplexer 48 outputs data B output from register 47 to adder 49. Adder 49 adds first decision variable data D output from register 50 and data B output from multiplexer 48. Thus, register 50 stores data D+B output from adder 49. The FIG. 5 apparatus embodying algorithm 3 is advantageous since all addition operations are accomplished by adding only two terms and each variable is independently updated by parallel operation.

The algorithm 3 can be embodied by a high-speed hardware system, but has a limitation since only two sampling periods $KT\Delta$ $(K-1)T\Delta$ are generated. For example, when an aperture of an array transducer is very large and a value of K is very large, equation (6) cannot be met. Accordingly, an exact sampling cannot be performed using two sampling periods. As an example of such a case, a bandwidth sampling of the above-discussed reference [6] can be referred to. In this case, three sampling periods such as $KT\Delta$, $(K-1)T\Delta$ and $(K-2)T\Delta$ can be calculated, to greatly relax a condition of the equation (6). Hereinbelow, an algorithm for obtaining two sampling periods is proposed.

Figure 6A:
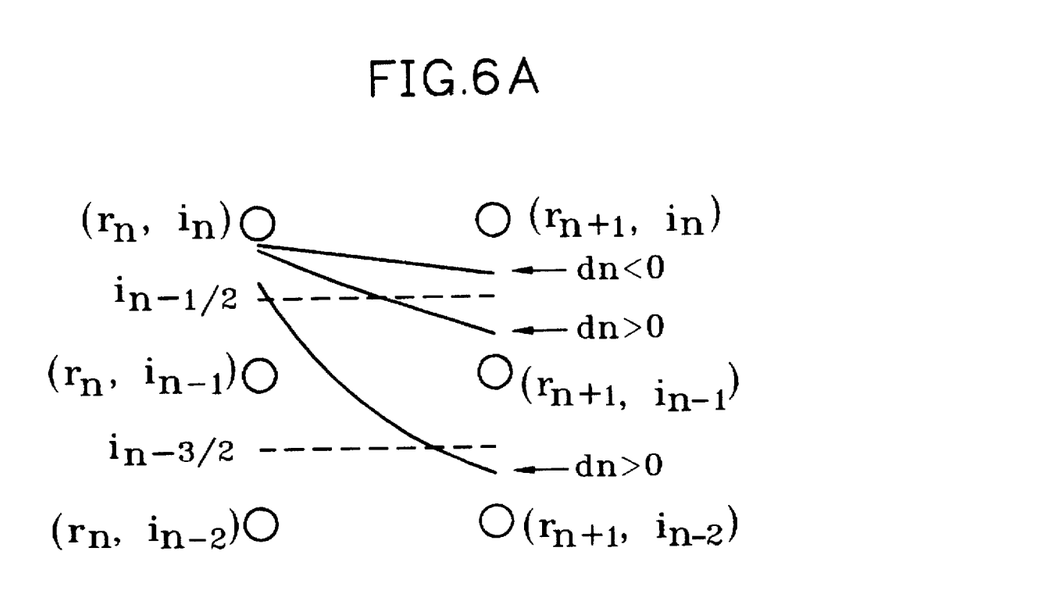
FIGS. 6A and 6B are conceptual views for explaining another proposed algorithm 4 for calculating focusing delay to generate three sampling periods according to another aspect of the present invention.
Figure 6B:
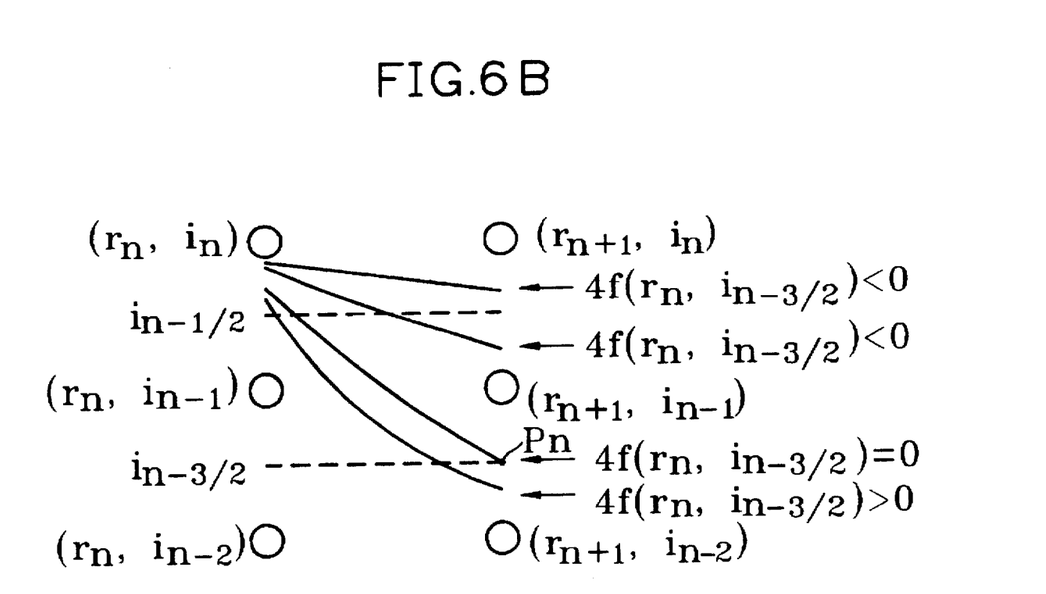

FIGS. 6A and 6B are conceptual views for explaining another proposed algorithm for calculating focusing delay to generate three sampling periods according to another aspect of the present invention. In FIGS. 6A and 6B, each point represents a position for obtaining image information to be represented on a screen as in FIG. 2. The above described algorithms 1-3 comparatively directly employ the midpoint algorithm, while this algorithm is further extended from algorithms 1-3 to obtain three sampling periods. To obtain three sampling periods $KT\Delta$, $(K-1)T\Delta$ and $(K-2)T\Delta$, a position (r, i) which is the closest to a value of function f(r, l)=0 is determined as one among three points $(r_{n+1}, i_n)$, $(r_{n+1}, i_n-1)$, and $(r_{n+1}, i_n-2)$, considering a sign and value of $d_n$. Two points $(r_{n+1}, i_n)$ and $(r_{n+1}, i_n-1)$ are identical to the points used in algorithms 1-3. The point $(r_{n+1}, i_n-2)$ is newly added to obtain three sampling periods. Given initial point $(r_0, i_0)$, the next position becomes $(r_{n+1}, i_n)$ when $d_n<0$. Meanwhile, the next position becomes one of $(r_{n+1}, i_n-1)$ and $(r_{n+1}, i_n-2)$ according to a value of $d_n$ when $d_n \geq 0$ as can be seen from FIG. 6A. Thus, a second decision variable $u_n$ which equals $4 \cdot f(r_{n+1}, i_n-\frac{3}{2})$ is newly defined to select one among three points. From a characteristic of function f(r, l), if a value satisfying function f(r, l)=0 passes a point $P_n$ which equals $(r_{n+1}, i_n-\frac{3}{2})$, second decision variable $u_n$ becomes 0. If a value satisfying function f(r, l)=0 passes below a point $P_n$, second decision variable $u_n$ becomes positive. If a value satisfying function f(r, l)=0 passes over a point $P_n$, second decision variable $u_n$ becomes negative. A relationship between such decision variables $u_n$ and $d_n$ follows equation (13)

$$u_n + 8L_n - 8 = d_n \quad (13)$$

Here, $L_n = i_n + Kr_n + K$. From equation (13) and function f(r, l), the following relationship 1 is obtained.

Relationship 1:

(a) If a value satisfying f(r, l)=0 passes in the neighbourhood of a point $(r_{n+1}, i_n)$, then $d_n<0$;

(b) If a value satisfying f(r, l)=0 passes in the neighbourhood of a point $(r_{n+1}, i_n-1)$ while not in the case of (a), then $0 \leq d_n \leq 8L_n - 8$; and (c) If a value satisfying f(r, l)=0 passes in the neighbourhood of a point $(r_{n+1}, i_n-2)$ while not in the cases of (a) and (b), then $d_n > 8L_n - 8$.

If the sign and value of first decision variable $d_n$ are used in the above relationship 1, a point closest to a value satisfying equation f(r, l)=0 can be determined. If $8L_n - 8$ is defined as a comparison reference value $T_n$ which is calculated again by the value of the prior step, $T_n$ is compared with $d_n$ with respect to all n-th steps. The resultant new focusing delay calculation algorithm is as follows.

Algorithm 4: A new focusing delay calculation algorithm

```
/* Define N1, N2, N3 */
    N1 = -4 × K × (1 + α);
    N2 = -4 × K × α - 20 × K + 8;
    N3 = -4 × K × α - 36 × K + 24;
/* Initialize r, i, d, T */
    r = r₀;
    i = i₀;
    d = d₀;
    T = T₀;
/* Algorithm body */
for (n = 0; n < N; n++){
    output(r, i);
    if (d ≤ 0){
        d = d + 8 × K × i + N1;
        r = r + 1;
        T = T + 8K;
    }
    else if (0 ≤ d ≤ 8 × L - 8){
        d = d - 8 × (1 - K) × i - 8 × K × r + N2;
        r = r + 1;
        i = i - 1;
        T = T + 8 × K - 8;
    else if (dₙ > 8 × L - 8){
        d = d - 8 × (2 - K) × i - 16 × K × r + N3;
        r = r + 1;
        i = i - 2;
        T = T + 8 × K - 16;
    }
}
```

Since calculation of $d_n$ according to algorithm 4 includes at least two times addition operations, a speed of the calculation is lowered. Thus, as in the above algorithm 2, the algorithm 4 is restructured and paralleled by the following method. First, to simplify the calculation of $d_n$, if it is defined that $A_n = 8Ki_n - 4K(1+\alpha)$, $B_n = -8(1-K)i_n - 8Kr_n - 4K\alpha - 20K + 8$, and $C_n = -8(2-K)i_n - 16Kr_n - 4K\alpha - 36K + 24$ the following relationship 2 is established.

Relationship 2:

(a) If $d_n < 0$, then $d_{n+1} = d_n + A_n$.

(b) If $0 \leq d_n \leq 8L_n - 8$ while not in the case of (a), then $d_{n+1} = d_n + B_n$; and (c) If $d_n > 8L_n - 8$ while not in the cases of (a) and (b), then $d_{n+1} = d_n + C_n$.

If initial values $A_0$, $B_0$ and $C_0$ of the addition operation are given, $A_n$, $B_n$ and $C_n$ are not directly calculated, but updated by the following relationship 3 using the corresponding values of the prior step.

Relationship 3:

(a) If $d_n < 0$, then $A_{n+1} = A_n$, $B_{n+1} = B_n - 8K$, and $C_{n+1} = C_n - 16K$;

(b) If $0 \leq d_n \leq 8L_n - 8$ while not in the case of (a), then $A_{n+1} = A_n - 8K$, $B_{n+1} = B_n - 16K + 8$, and $C_{n+1} = C_n - 24K + 16$; and c) If $d_n > 8L_n - 8$, while not in the cases of (a) and (b), $A_{n+1} = A_n - 16K$, $B_{n+1} = B_n - 24K + 16$, and $C_{n+1} = C_n - 32K + 32$.

-continued

Relationship 3:
The above contents are summarized as the following algorithm 5.

```
Algorithm 5: The pattern paralleling algorithm 2
/* Define N1, N2, N3, N4, N5, N6, N7 */
    N1 = -8 × K;
    N2 = -16 × K + 8;
    N3 = -16 × K;
    N4 = -24 × K + 16
    N5 = -32 × K + 32;
    N6 = 8 × K - 8;
    N7 = 8 × K - 16;
/* Initialize r, i, d, T */
    r = r₀;
    i = i₀;
    d = d₀;
    T = T₀;
    A = A₀;
    B = B₀;
    C = C₀;
/* Algorithm body */
for (n = 0; n < N; n++){
    output(r, i);
    if (d ≤ 0){
        T = T - N1;
        d = d - A;
        r = r + 1;
        B = B + N1;
        C = C + N3;
    }
    else if ( 0 ≤ d ≤ 8L - 8){
        T = T + N6;
        d = d + Bₙ;
        r = r + 1;
        i = i - 1;
        A = A + N1;
        B = B + N2;
        C = C + N4;
    }
    else{
        T = T + N7;
        d = d + C;
        r = r + 1;
        i = i - 2;
        A = A + N3;
        B = B + N4;
        C = C + N5;
    }
}
```

Figure 7:
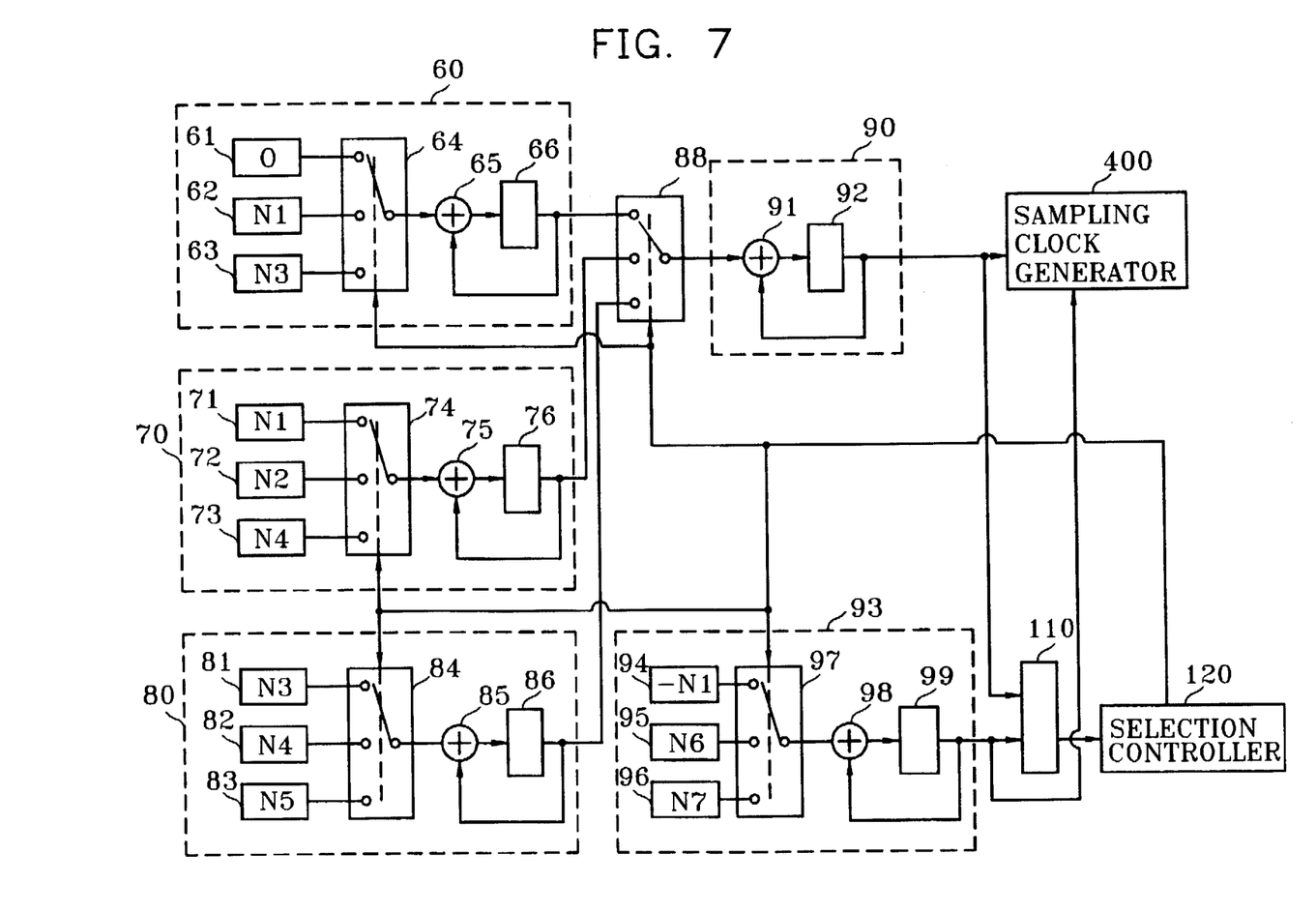
FIG. 7 is block diagram showing an apparatus embodying the algorithm 5 according to yet another embodiment of the present invention.

FIG. 7 is block diagram showing an apparatus embodying the algorithm 5 according to yet another embodiment of the present invention, which will be described later. Meanwhile, first decision variable $d_n$ has the largest value among values of various variables in the above algorithms. With respect to $l_z$ satisfying that $f(r_{n+1}, l_z)=0$, an integer $i_n$ which is the closest to $l_z$ is represented as the following expression (14).

$$i_n = l_z + \Delta, |\Delta| \leq 1 \tag{14}$$

From equations (8) and (14), $$d_n = 4(l_z + \Delta)^2 + 8(l_z + \Delta)K(r_n + 1) - 4\alpha K(r_n + 1) - 4\beta \tag{15}$$

$$= 8l_z\Delta + 4\Delta^2 + 8\Delta K(r_n + 1)$$

In equation (15), since $r >> l_z$, $r >> |\Delta|$ mostly, $$d_n \approx 8\Delta K r_n \tag{16}$$

Here, since $r_n$ is obtained by multiplying n by K, Kr in equation (16) is replaced by r on the same scale as 1 in the algorithm 2. If a speed of the ultrasound is 1,480 m/sec and a temporal precision of the sampling clock is 20 ns, the unit distance is 29.6 μm. Accordingly, assuming that the maximum value is 20 cm, the maximum value $d_{max}$ of $d_n$ is approximately 54,054. To represent $d_{max}$ into a binary number, about sixteen bits are required. Also, considering that all coefficients are multiplied by a constant to reduce a coefficient truncation error, the system uses about nineteen bits as a proper word length in the most of the actual case.

Returning to the above algorithm 1, when the linear array transducer is used, conditions 1) and 2) are well met, $i_n$ is accurately calculated. However, when the phased array transducer is used, condition 2) is satisfied by a proper variation of r, but condition 1) is not satisfied even with the variation. Thus, α and β in equation (1) are inevitably truncated. Here, the generated truncation error is reviewed below. When a coefficient is truncated, equation (1) is expressed as the following equation (17).

$$l_e = (r^2 + (\alpha + e_1)r + (\beta + e_2))^{0.5} - r \tag{17}$$

Here, $l_e$ is a real number having the relationship in which $l_e = l + e_0$, and represents l which is influenced by the truncation. The $e_1$ and $e_2$ represent truncation errors which satisfy expressions $|e_1| < 0.5$ and $|e_2| < 0.5$, respectively. From equations (1) and (17), the following equation (18) is obtained.

$$e_0^2 + 2(1+r)e_0 - e_1 r - e_2 = 0 \tag{18}$$

From the roots of equation (18), the following equation (19) can be obtained.

$$e_0 = -(1+r) \pm ((1+r)^2 + e_1 r + e_2)^{0.5} \tag{19}$$

The sign "±" in equation (19) is replaced by sign "+" since $e_0 = 0$ when $e_1 = e_2 = 0$ from equations (1) and (17). First, when $e_1 > 0$ and $e_2 > 0$, if $x \geq 0$, then $(1+x)^{0.5} \leq x+1$. Thus, from equation (19), the following equation (20) can be obtained.

$$0 \leq e_0 \leq \frac{e_1 r + e_2}{(1+r)} \tag{20}$$

Using the fact $(1+x)^{0.5} \geq x+1$ under the condition, $-1 \leq x \leq 0$, equation (20) is extended as the following equation (21).

$$|e_0| \leq |\frac{e_1 r + e_2}{1+r}| \tag{21}$$

In actuality, since 1+r≈r in most cases, $e_0$ is expressed as the following equation (22).

$$e_0 = \frac{e_1 r + e_2}{2(1+r)} \cong \frac{e_1}{2} \tag{22}$$

However, such an error is not well observed. If such an error is not acceptable, all the coefficients are multiplied by a proper constant and then the multiplied results are truncated to reduce a truncation error, so that a sufficient precision can be obtained. The transducers of a convex array, a concave array, an annular array and a two-dimensional array are similar to the phased array transducer in view of the geometrical structure of reception focusing. Also, the above-described algorithm of the present invention calculates the focusing delay time using the information on the center of the array transducer, the corresponding array element and the scan line. Accordingly, the algorithm according to the present invention can be applied to a general beam focusing using the array transducer having various types as well as the ultrasound reception focusing.

FIG. 7 is a block diagram of an apparatus embodying algorithm 5, by using registers, multiplexers and comparators. FIG. 7 shows algorithm 5 for generating a sampling clock with respect to a single transducer element. The FIG. 7 apparatus embodying the present invention includes coefficient generators 60, 70 and 80 having the same structure, respectively. The signal output ends of coefficient generators 60, 70 and 80 are connected to a multiplexer 88. The output signal of multiplexer 88 is supplied to decision variable generator 90 which generates a decision variable signal $d_n$. A comparison reference value generator 93 generates a comparison reference signal $T_n$ which is compared with first decision variable $d_n$ and supplies the generated signal to a sampling clock generator 400. A comparator 110 compares decision variable signal $d_n$ with the comparison reference signal $T_n$ and supplies the comparison resulting signal $C_{out}$ to a selection controller 120. Selection controller 120 receives the output signal of comparator 110 and supplies the select control signal to multiplexers 64, 74, 84, 88 and 97. Sampling clock generator 400 receives decision variable signal $d_n$ and comparison reference signal $T_n$ and generates a sampling clock signal.

Coefficient generators 60, 70 and 80 and comparison reference value generator 93 includes registers which are designed so that coefficients N1–N7 shown in the algorithm 5 are output. The coefficients used in algorithm 5 are labelled in the respective register blocks. First coefficient generator 60 includes a register 61 for generating a signal being a signal value of "0," a register 62 which is designed according to coefficient N1, and a register 63 of coefficient N3. The signal output ends of registers 61, 62 and 63 are connected to multiplexer 64. The signal output end of adder 65 is connected to latch 66, and adds the output signals of latch 66 and multiplexer 64. Second coefficient generator 70 includes a register 71 which is designed according to coefficient N1, a register 72 of coefficient N2 and a register 73 of coefficient N4. Second multiplexer 74 are connected to receive the output signals of registers 71, 72 and 73. Third coefficient generator 80 includes a register 81 of coefficient N3, a register 82 of coefficient N4 and a register 83 of coefficient N5. Third multiplexer 84 are connected to receive the output signals of registers 81, 82 and 83. Second and third coefficient generators 70 and 80 include adders 75 and 85 and latches 76 and 86 which are disposed in the same manner as those of first coefficient generator 60, respectively. Decision variable generator 90 includes an adder 91 of which the signal output end is connected to latch 92 and adds the output signals of latch 92 and multiplexer 88. Comparison reference value generator 93 includes registers 94, 95 and 96, multiplexer 97, adder 98 and latch 99 which are disposed in the same manner as those of coefficient generators 60, 70 and 80.

First, if decision variable generator 90 outputs a decision variable signal $d_n$ of the n-th step and comparison reference value generator 93 outputs the stored comparison signal $T_n$, respectively, comparator 110 compares two signals $d_n$ and $T_n$ and generates comparison resulting signal $C_{out}$ to be output to selection controller 120. Selection controller 120 generates a select control signal corresponding to comparison resulting signal $C_{out}$ according to the above-described relationship 3. Each of multiplexers 64, 74 and 84 in coefficient generators 60, 70 and 80 selects one among the signals supplied from the registers according to the input select control signal. For example, if the n-th decision variable signal $d_n$ satisfies the condition where $d_n<0$, multiplexer 64 outputs the signal supplied from register 61, multiplexer 74 outputs the signal supplied from register 71, and multiplexer 84 outputs the signal supplied from register 81. Adder 65 adds the output signal of second multiplexer 64 and signal $A_n$ stored in latch 66, that is, the signal obtained by the n-th operation. Latch 66 outputs stored signal $A_n$ and stores a new signal $A_{n+1}$ supplied from adder 65. Since the adders and the latches in second and third coefficient generators 70 and 80 operate in the same manner as that of first coefficient generator 60, the detailed description thereof will be omitted.

Multiplexer 88 selectively outputs signals $A_n$, $B_n$ and $C_n$ output from coefficient generators 60, 70 and 80. When $d_n<0$, multiplexer 88 outputs the signal $A_n$ supplied from latch 66 according to the above-described relationship 2. Adder 91 adds the output signal $d_n$ of latch 92 and signal $A_n$. Latch 92 stores a new signal $d_{n+1}$ therein. Multiplexer 97 in comparison reference value generator 93 supplies the output signal of register 94 to adder 98 according to algorithm 5 when $d_n<0$. If adder 98 adds comparison reference signal $T_n$ of latch 99 and the output signal of multiplexer 97 and outputs the added result, latch 99 stores a new signal $T_{n+1}$ therein. Signals $d_{n+1}$ and $T_{n+1}$ stored in decision variable generator 90 and comparison reference value generator 93 are used in generation of the select control signal at the next stage and calculation of the focusing delay time at the next stage to be described below.

Coefficient generators 60, 70 and 80 and sampling clock generator 400 store a plurality of initial values which are used in calculation of the focusing delay distance signal. Such initial values have integer values via truncation according to the pattern of the applied transducers, which are $A_0$, $B_0$, $C_0$, $r_0$ and $i_0$ described in algorithm 5. Sampling clock generator 400 receives comparison reference signal $T_n$ and decision variable signal $d_n$, compares the magnitudes thereof, and updates the stored integer focusing delay distance signal $i_n$ and focusing reference distance signal $r_n$ according to the comparison result. Sampling clock generator 400 uses a newly obtained (n+1)-th integer focusing delay distance signal $i_{n+1}$ to calculate an integer focusing delay time signal. Also, sampling clock generator 400 uses the integer focusing delay time signal to generate a sampling clock signal corresponding to each array element. That is, sampling clock generator 400 generates a sampling clock with respect to (n+1)-th focusing point in the sampling interval of the integer focusing delay time interval.

As described above in connection with equation (2), various algorithms proposed in the present invention employs the simplest midpoint algorithm illustratively based on the fact that a second order equation is established between a focal length and a focusing delay distance l. It is apparent that the other drawing algorithms can be applied to the present invention. Also, since the circuitry embodying the proposed algorithm is only illustrative, it is apparent that various modifications can be possible.

As described above, since the present invention apparatus calculates the focusing delay time on a real time basis with a sufficient precision using only an integer adder, a digital focusing system can be embodied in the ASIC. The present invention apparatus can independently calculate the focusing delay time with respect to each array element, to thereby simplify the system construction.

INDUSTRIAL APPLICABILITY

The above-described algorithm of the present invention calculates the focusing delay time using the information on the center of the array transducer, the corresponding array element and the scan line. Accordingly, the algorithm according to the present invention can be applied to a general beam focusing technology using the array transducer having various patterns as well as the ultrasound reception focusing.

What is claimed is:

1. A real time digital reception focusing method for sampling a signal having image information on an object received via an array transducer having a plurality of transducing elements and for performing a digital reception focusing of the sample image information, the real time digital reception focusing method comprising the steps of:

(a) establishing an integer focusing reference distance and an integer focusing delay distance with respect to each of the transducing elements so that a rate of change of the focusing delay distance with respect to the focusing reference distance when a focal point is altered is within a predetermined boundary;

(b) updating the integer focusing reference distance and the integer focusing delay distance with respect to a second focal point according to a magnitude of a decision variable with respect to a first focusing point and coefficients for calculating the decision variable; and (c) generating a sampling clock for focusing a signal having the image information input to each of the transducing elements into the second focal point by a sampling interval corresponding to the updated integer focusing delay distance.

2. The real time digital reception focusing method according to claim 1, wherein said step (a) establishes said predetermined boundary between $-1/K$ and 0 with respect to a calculation amount determination factor K for determining a calculation amount of the integer focusing delay distance.

3. The real time digital reception focusing method according to claim 1, wherein said step (b) establishes the values of said predetermined decision variable, said integer focusing reference distance, said integer focusing delay distance and said coefficients with respect to a particular focal point as initial values for updating said decision variable, said integer focusing reference distance, said integer focusing delay distance and said coefficients according to alteration of the focal point.

4. The real time digital reception focusing method according to claim 1, wherein said step (b) uses the first decision variable to select the updated integer focusing delay distance from two possible integer focusing delay distances.

5. The real time digital reception focusing method according to claim 4, wherein said coefficients are determined according to a geometrical relationship of the first focal point and the transducing element.

6. The real time digital reception focusing method according to claim 4, wherein in said step (b), said coefficients and said decision variable have patterns for parallel operation.

7. The real time digital reception focusing method according to claim 1, wherein said step (b) uses the second decision variable to select the updated integer focusing delay distance from three possible integer focusing delay distances.

8. The real time digital reception focusing method according to claim 7, wherein said coefficients are determined according to a geometrical relationship of the first focal point and the transducing element.

9. The real time digital reception focusing method according to claim 7, wherein in said step (b), said coefficients and said decision variable have patterns for parallel operation.

10. A real time digital reception focusing apparatus for sampling a signal having image information on an object received via an array transducer having a plurality of transducing elements and performing a digital reception focusing of the sample image information, the real time digital reception focusing apparatus comprising:

means for generating a first coefficient signal in the form of an integer which is used for generating a decision variable signal;

means for receiving said first coefficient signal generated from said coefficient signal generation means and generating the decision variable signal; and means for receiving said decision variable signal, calculating an integer focusing delay distance according to a magnitude of the decision variable signal, and generating a sampling clock by a sampling interval corresponding to the integer focusing delay distance.

11. The real time digital reception focusing apparatus according to claim 10, wherein said coefficient signal generation means comprises coefficient signal generators for generating the first coefficient signals which are used for generation of the decision variable signal with respect to the next focusing point;

a selection controller for receiving the decision variable signal with respect to the present focal point from said decision variable signal generation means to generate a select control signal for generating a decision variable signal with respect to the next focal point; and a first multiplexer for selectively outputting one among the first coefficient signals supplied from said coefficient signal generators.

12. The real time digital reception focusing apparatus according to claim 11, wherein said decision variable signal generation means comprises a first latch for storing the decision variable signal with respect to the present focal point; and a first adder for adding the coefficient signal applied from said first multiplexer and the decision variable signal with respect to said present focusing point which is stored in said first latch.

13. The real time digital reception focusing apparatus according to claim 12, wherein said sampling clock generation means generates a sampling clock corresponding to a single transducing element with respect to said present focal point.

14. The real time digital reception focusing apparatus according to claim 13, further comprising a comparison reference signal generator for generating a comparison reference signal which is compared with the decision variable signal with respect to said present focal point; and a comparator for receiving the comparison reference signal and the decision variable signal, comparing both signals and outputting the comparison resulting signal to said sampling clock generation means and said selection controller, respectively.

15. The real time digital reception focusing apparatus according to claim 14, wherein said selection controller receives said comparison resulting signal and generates said select control signal.

16. The real time digital reception focusing apparatus according to claim 15, wherein said sampling clock generation means stores a plurality of the integer focusing delay distance signals corresponding to a magnitude of the decision variable signal with respect to the present focal point, and selects one among said plurality of the integer focusing delay distance signals by comparing said decision variable signal with said comparison reference signal.

17. The real time digital reception focusing apparatus according to claim 16, wherein each of said coefficient signal generators comprises a plurality of first registers for storing second coefficient signals;

a second multiplexer for selecting one among the output signals of said first registers according to the select control signal;

a second latch for storing the first coefficient signal with respect to the present focusing point; and a second adder for adding the signals output from said second latch and said second multiplexer.

18. The real time digital reception focusing apparatus according to claim 17, wherein said comparison reference signal generator comprises a plurality of second registers for storing third coefficient signals;

a third multiplexer for selecting one among the output signals of said second registers according to the select control signal;

a third latch for storing the comparison reference signal with respect to said present focal point; and     a third adder for adding the signals output from said third latch and said third multiplexer.

19. The real time digital reception focusing apparatus according to claim 18, wherein each of said registers varies the storage value according to the calculation amount factor K which is to determine a calculation amount of the integer focusing delay distance.

* * * * *